United States Patent [19]

Clayton

[11] 4,348,455
[45] Sep. 7, 1982

[54] THERMOPLASTIC FOOD WRAPPING FILM HAVING IMPROVED CLING

[75] Inventor: William J. Clayton, Fairport, N.Y.

[73] Assignee: Mobil Oil Corporation, New York, N.Y.

[21] Appl. No.: 244,496

[22] Filed: Mar. 16, 1981

[51] Int. Cl.³ .......................... B32B 27/00; B05D 5/10
[52] U.S. Cl. .................................. 428/336; 427/208.2; 428/216; 428/337; 428/341; 428/349; 428/500; 428/522; 428/523
[58] Field of Search ............... 428/336, 346, 347, 349, 428/521, 522, 523, 500, 337, 341, 216; 427/208.2

[56] References Cited
U.S. PATENT DOCUMENTS 3,070,462  12/1962  McConnell et al. ................ 428/337

Primary Examiner—Thomas J. Herbert, Jr.
Attorney, Agent, or Firm—Charles A. Huggett; James F. Powers, Jr.; James P. O'Sullivan, Sr.

[57] ABSTRACT

The shear strength cling of thermoplastic food wrap film is improved by coating at least one surface of the film with a composition comprising a major proportion of an alkali metal dialkyl sulfosuccinate and a minor proportion of a high boiling moisturizing liquid.

19 Claims, No Drawings

THERMOPLASTIC FOOD WRAPPING FILM HAVING IMPROVED CLING

BACKGROUND OF THE INVENTION

1. Field of the Invention

For a number of years, there have been available to consumers transparent, flexible films of thermoplastic organic resins packaged in rolls, which films are used for the wrapping and preservation of various foods in home refrigerators. It is to the improvement of the surface characteristics of such films that the present invention is directed.

The flexible thermoplastic film wrappings which have achieved commercial importance and which are modified according to the present invention include those manufactured from plasticized polyvinyl chloride, copolymers of polyvinylidene chloride, e.g., Saran, polybutylene and particularly low density polyethylene and copolymers thereof. Such films offer the advantages of transparency, low water vapor transmission, high permeability to oxygen, and resistance to mechanical and chemical deterioration over long periods of time even when subjected to substantial temperature changes as by refrigeration. Moreover, such films may be utilized a number of times in wrapping and unwrapping of food products without significant loss of the desirable mechanical and physical characteristics, such as self-adherence, strength and flexibility.

Notwithstanding the generally desirable properties of such thermoplastic film wrappings, which have to a substantial extent displaced other types of protective wrappings, such as wax paper, plastic coated paper, aluminum foil and the like, there is one property of importance to the householder which it has long been desired to improve, namely, the cling of the thermoplastic film. It is the specific object of the present invention to increase the cling of household thermoplastic food wrapping while at the same time maintaining other desirable properties of the film and, indeed, even improving such properties while increasing the cling value.

As utilized herein, the term "cling" is used to indicate the shear strength cling of the film surface to such other smooth surfaces as glass, stainless steel, aluminum, and plastic articles, such as bowls to which adherence of household food wrap is highly desired in conventional use by the householder wherein bowls of such smooth surfaced materials are used to contain food. The bowls are covered by adherence of a sheet of food wrap over the bowl and over a part of the outside surface thereof.

Of great significance in the present invention is the fact that improved cling is obtained without sacrifice of the other desirable properties of the food wrap by virtue of a coating which does not impart excessive stickiness or display a greasy feel brought about by the use of other coatings previously disclosed in the prior art.

2. Description of the Prior Art

In the past, numerous efforts have been made to modify the surface characteristics of transparent flexible thermoplastic films, most of which efforts have been directed to films used for commercial packaging of various food products. One problem which has frequently been addressed is the problem of fogging encountered when the normally hydrophobic thermoplastic films are utilized to package moisture emitting products. Examples of patents dealing with this problem are U.S. Pat. Nos. 2,365,297; 3,048,263; 3,212,909; 3,205,077; 3,355,313; and, 3,741,803. A common ingredient in many of the patents, wherein a coating is applied to the surface of the thermoplastic films, is a surface active or wetting agent which improves the spreading action of the various coating compositions on the films which films are otherwise resistant to wetting by liquids. Indeed, the alkali metal dialkyl sulfosuccinates which form the essential ingredient of compositions employed in the present invention (as described in more detail hereinafter) have been utilized as wetting agents in various compositions. In addition, alkali metal salts of dialkyl sulfosuccinates have, themselves, been found to have an anti-fogging effect on thermoplastic films. Thus, in French Pat. No. 1,321,800, issued Feb. 11, 1963, said alkali metal salts of dialkyl sulfosuccinates are described as agents for anti-fogging purposes where these salts, without other ingredients, are applied to the thermoplastic films in a solvent such as water or a lower aliphatic alcohol. No mention of cling is found in this patent, and, indeed, the antithesis of cling is obtained since the inventor describes the films produced as being non-sticky, possessing good sliding properties and great resistance to scratching. Experiments by the present inventor have confirmed these observations, where it has been found that the sodium dialkyl sulfosuccinates deposited from an alcohol solution result in a hard, non-cling surface.

Though most of the prior art deals with modification of surface characteristics of films used in commercial applications, U.S. Pat. No. 3,070,462 to McConnell et al is also concerned with flexible film wrapping of the nature herein contemplated, namely, those intended for household use. This patent alleges the improvement of a number of characteristics of the film, including reduction in blocking and electrostatic propensities and further alleges improved contact adhesiveness for smooth surfaces, i.e., cling, by application of a surface coating comprising a liquid surface modifying agent selected from the group consisting of aliphatic monohydric alcohols having in excess of 6 carbon atoms, polyhydric alcohols, esters of long chain fatty acids and oils in admixture with a minor proportion of a surfactant. The patentees describe the surfactants or wetting agents as necessary to compensate for the wetting resistance of the hydrophobic film to combine with the liquid surface modifier, and states that non-ionic, cationic and anionic surfactants may be used. Among the surfactants listed is sodium dioctyl sulfosuccinate, though no specific examples utilizing this surfactant are disclosed. In any event, all surfactants and wetting agents are equated, and all are used in minor amounts in relation to the liquid surface modifying agents.

Unfortunately, it has been found that the use of various viscous or sticky liquids as the predominant ingredient of coating compositions such as disclosed by McConnell et al and other patents, though improving cling values, also produces certain disadvantages results, such as imparting an unpleasant odor or taste to the film and the food wrapped therein. Moreover, the coatings frequency have a greasy feel and smeary appearance which renders them practically unacceptable as a food wrap for sale to consumers.

SUMMARY OF THE INVENTION

In accordance with the present invention, it has been found that greatly improved cling can be imparted to conventional, transparent, flexible thermoplastic food wrap films by providing a thin coating layer on at least one surface of said film comprising a major proportion of alkali metal salts of dialkyl sulfosuccinates in combination with a minor proportion of a moisturizing liquid which prevents drying of said coating in normal use. The coatings utilized herein provide this improved cling without sacrifice of the other desirable properties of the film as discussed above and are not noticeable by the user.

DESCRIPTION OF SPECIFIC EMBODIMENTS

The alkali metal dialkyl sulfosuccinates utilized in the present invention may be represented by the following formula:

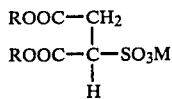

wherein R is alkyl containing 4–8 carbon atoms and M is an alkali metal, e.g., sodium, potassium or lithium. Sodium is the preferred metal. Mixtures of such compounds may also be utilized. In the preferred compound, R represents an alkyl group containing 6–13 carbon atoms. Most preferred is the compound sodium di-2-ethylhexyl sulfosuccinate. No other surfactants have been found to possess the cling imparting characteristics of the above defined sulfosuccinates.

The moisturizing liquid used in the instant compositions, as the name implies, serve the purpose of preventing the drying out of the alkali metal dialkyl sulfosuccinates which would result in the formation of a non-clinging hard surface as described in the above French patent. These moisturizing liquids include the polyols, such as, for instance, the dihydric alcohols, e.g., ethylene glycol, propylene glycol, butylene glycol, hexylene glycol; trihydric alcohols such as glycerol and higher polyhydric alcohols which are liquid and have a boiling point above 190° C. Also suitable for use as the moisturizer component of the present coating compositions are the liquid high boiling esters of phthalic acid and adipic acid which are widely used as plasticizers. These plasticizers have a minimum boiling point of 350° C. and solubility in lower aliphatic alcohols (as do the polyols). They include 2-ethylhexyl isodecyl phthalate, butyl cyclohexyl phthalate, butyl benzyl phthalate, dicyclohexyl phthalate, di(methylcyclohexyl)phthalate, diphenyl phthalate, octyl benzyl phthalate, dimethoxy ethyl phthalate, diethoxyethyl phthalate, dibutoxyethyl phthalate, diisobutyl adipate, di-2-ethylhexyl adipate, n-octyl, n-decyl adipate, diisodecyl adipate, dibutoxyethyl adipate, di(methylcyclohexyl) adipate and bis(2,2,4-trimethyl-1,3-pentanediolmonoisobutyrate) adipate.

All of the moisturizing liquids share the properties of being liquid at room temperature, being soluble in lower alcohols and having a vapor pressure sufficiently high so that no significant amount is lost (less than about 5%) in long term storage at room temperature or at higher temperatures encountered in normal use, thereby preventing drying.

The alkali metal dialkyl sulfosuccinates are prepared by methods well known in the art and are commercially available from a number of suppliers including the American Cyanamid Company and Mona Industries, Inc. They are generally supplied in the form of solutions in water or water-alcohol solvents, though some are also available as anhydrous viscous liquids dissolved in, e.g., propylene glycol and hexylene glycol. Before use in the present invention, any solutions of the alkali metal dialkyl sulfosuccinates which contain water should be boiled or otherwise heated to drive off all water, and best results are obtained when such water containing solutions are first mixed with the moisturizer, e.g., glycerol, and then heated to drive off the water, thus producing a tacky clear liquid.

It is essential for successful practice of the present invention that certain critical parameters be observed with regard to the ratio of alkali metal dialkyl sulfosuccinate to the moisturizing liquid used, e.g., glycerol. Specifically, the composition should consist essentially of about 5–20% by weight of a liquid moisturizer and 80–95% by weight of the alkali metal dialkyl sulfosuccinate. When employing less than 5% of the moisturizer, improved cling cannot be obtained. When using more than about 20% of the moisturizer, though cling is improved, there results a film having a greasy feel and in some cases, results in a coating which is visible on the surface of the film, which would result in unacceptability to the consumer. By observing the ratio set forth above, however, there is produced a coating which is not noticeable, as such, to the consumer but which still brings about excellent cling while retaining the clear transparency and strength. In addition, static cling and fogging are eliminated, and high gloss with improved appearance of the food product is obtained.

Various conventional methods can be utilized in applying the compositions of the present invention to the surface of the film which is coated. Specifically, a dilute solution of the coating composition is obtained by dissolving said composition in a lower alcohol such as ethyl alcohol or isopropanol. The concentration of the solution should be about 80–99% alcohol per 1–20% of coating composition by volume, with a ratio of 90–98% alcohol being preferred. The most preferred solution contains 2% of the coating composition and 98% of the alcohol. Though water may be used as a solvent, as well as water-alcohol mixtures, these are less preferred from an operation viewpoint than the volatile solvents such as ethyl or isopropyl alcohol. The use of volatile solvents such as lower alcohols which evaporate rapidly after coating of the film is ultimately more economical since the alcohol solution which has been coated upon the film will evaporate without the need for expensive heating steps. Actually, it has been found that the coated film may be immediately wound into rolls and boxed without any need for a separate drying step. By elimination of a drying step, one eliminates the need for expensive drying equipment, the energy costs involved in drying and the need for additional personnel.

The alcohol solution may be coated upon the thermoplastic film to produce good distribution of the composition over the whole surface of the film by any of many well known methods. For example, the film may be brought into contact with a wick, roll or felt which has been wetted with the solution. Alternatively, the solution may be applied to the article by spraying, brushing or rotagravure.

The total content of the cling imparting composition in the alcohol solution depends upon the desired thickness of the coating desired, as well as the method of application used. It has been found that the solution should be applied in a sufficient amount to leave a residual surface coating of 1.2 to $3.6 \times 10^{-2}$ mils thickness.

$2.4\times10^{-2}$ mils thickness is preferred. The preferred corresponding coating weight is 0.6 to 0.18 grams of coating per 100 square feet of film with 0.12 grams per 100 square feet being preferred. Conventional additional adjuvants may be employed with the composition, such as coloring agents or odor imparting agents. No additional ingredients are necessary, however, for anti-fog or anti-static purposes.

As previously indicated, the film to which the present coating agents are applied may be any of those well known thin, light, thermoplastic, hydrophobic films in widespread use. Such films include plasticized polyvinyl chloride, polyvinylidene chloride copolymers, polybutene, low density polyethylene and copolymers of polyethylene. These films which are produced by known methods, e.g., casting or blow molding, are generally utilized in a thickness of about 0.25 to about 5.0 mils, and the preferred film thickness is from about 0.4 to 1.0 mils. A thickness of 0.4 to 0.6 mils is most preferred.

As previously indicated, use of the present coating composition containing a major proportion of the alkali metal dialkyl sulfosuccinates and a minor proportion of high boiling liquid moisturizing agents leads to greatly improved cling characteristics. Though not wishing to be bound by any particular theory, it is believed that the alkali metal sulfosuccinates bring about the improved cling action by virtue of providing an extremely smooth surface on the film, and when such coated film is applied to another smooth surface such as a bowl or itself, there is an exclusion of air resulting in a vacuum-type cling.

No objective test for cling has been found in the prior art, and, indeed, it is not believed that the prior art has always used the term "cling" to describe the same phenomenon. Thus, it is believed that in some cases the term "cling" has been used to refer to cling brought about by electrostatic action. In order to provide a measure of the same type of cling which a user requires for food storage, a test has been developed which is believed to be reliable, reproducible and fully understandable. In this test, there are provided four bowls having a circumference of about 12 inches made of four different smooth materials, namely, aluminum, glass, stainless steel and molded unpigmented polyethylene. A sheet of the film to be tested is placed over the mouth of the bowl and pressed into place around the outside surface thereof to a distance of $1\frac{1}{2}$ inches below the lip. Thereafter, a 3 inch diameter plastic container is placed in the center of the sheet covering the bowl. Steel shot is added to the container until the wrap slips or a value of 60 grams per inch of circumference of the bowl is reahed. Since no use conditions would require a cling value above 60 grams per inch, the test is stopped at this point. The results indicate the degree of shear strength cling. A film with a soft hand falls in place around the bowl and requires very little pressing to achieve maximum cling. A stiff film will not give a high cling value if it is not applied carefully.

The following examples are presented to illustrate more clearly the nature of the invention without limitation on its scope.

EXAMPLE 1

A sheet of commercially available low density polyethylene food wrap having a density of 0.90-0.925 gm/cc$^3$ was coated on one surface using a coating roller with a 2% solution (by volume) in isopropyl alcohol of a composition containing 90 parts by weight of sodium di-2-ethylhexyl-sulfosuccinate and 10 parts by weight of glycerol. With rapid evaporation of the alcohol, the residual film coating had a thickness of $2.4\times10^{-2}$ mil. The sheet of coating was then tested for shear strength cling according to the above-described test utilizing, respectively, bowls made of glass, stainless steel, aluminum and unpigmented molded polyethylene. In each case, a shear strength cling value of 60 grams per inch of bowl circumference was observed. This represents a degree of cling in excess of any normal user requirement.

EXAMPLE 2

The identical film utilized in the test described in Example 1, but having no coating, was subjected to the identical test on the four bowls. Though a value of 60 grams per inch of bowl circumference was obtained with glass, stainless steel and aluminum, a zero value was obtained on the bowl of upigmented polyethylene.

EXAMPLE 3

Other commercially available uncoated, thin, flexible, thermoplastic film products of various types were tested as shown in the following Table 1 with the reported results.

TABLE 1

| | Cling of Various Roll Wraps Expressed in Grams per Inch of Bowl Circumference | | | |
|---|---|---|---|---|
| Product | Glass | Type of Bowl Used Stainless Steel | Aluminum | Polyethylene (Unpigmented) |
| (1) Plasticized PVC | 60 | 60 | 60 | 0 |
| (2) Plasticized PVC | 60 | 17 | 11 | 0 |
| (3) PVDC copolymer | 60 | 17 | 0 | 0 |
| (4) Low density polyethylene | 60 | 8 | 0 | 0 |

EXAMPLE 4

Each of the films tested in Example 3 when coated in the same manner as set forth in Example 1 showed a shear strength cling value of 60 on all bowls. It was further observed that in each of the coated films produced by the coating method of the present invention, the coating was virtually invisible, the film maintained excellent clarity and was free of the greasy feel which resulted from using major proportions of glycerol and minor proportions of sodium dioctyl sulfosuccinate.

Although the present invention has been described with preferred embodiments, it is to be understood that modification and variations may be resorted to, without departing from the spirit and scope of this invention, as those skilled in the art will readily understand. For example, though the treated film wrap according to the present invention is one intended primarily for household use, films intended for commercial use, such as in food stores and other facilities, may also be produced by practice of the invention. Such variations and modifications are considered to be within the purview and scope of the appended claims.

What is claimed is:

1. A transparent, flexible, thermoplastic, food wrap film having improved shear strength cling, said film comprising having a coating on at least one surface thereof of a composition comprising (a) about 80–95 weight percent of at least one alkali metal dialkyl sulfosuccinate of the formula:

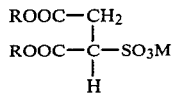

wherein R is alkyl containing 4–18 carbon atoms and M is an alkali metal and (b) about 5–20 weight percent of a lower alcohol soluble high boiling moisturizing liquid selected from the group consisting of dihydric alcohols, trihydric alcohols, higher polyhydric alcohols, esters of adipic acid and esters of phthalic acid.

2. The film according to claim 1, wherein said composition comprises about 90% by weight of said alkali metal dialkyl sulfosuccinate and about 10% by weight of said moisturizing liquid.

3. The film according to claim 1, wherein said moisturizing liquid is glycerol.

4. The film according to claim 1, wherein said alkali metal is sodium.

5. The film according to claim 1, wherein R is $C_6$–$C_{13}$ alkyl.

6. The film according to claim 1, wherein said film comprises plasticized polyvinyl chloride, polyvinylidene chloride copolymers, polybutene, low density polyethylene or copolymers of said low density polyethylene.

7. The film according to claim 1, wherein the thickness of said coating is $1.2 \times 10^{-2}$ to $3.6 \times 10^{-2}$ mils.

8. A process of increasing the shear strength cling of a transparent, flexible, thermoplastic, food wrap film comprising coating at least one surface of said film with a composition comprising (a) about 80–95 weight percent of at least one alkali metal dialkyl sulfosuccinate of the formula:

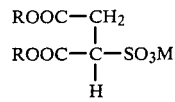

wherein R is alkyl containing 4–18 carbon atoms and M is an alkali metal, and (b) about 5–20 weight percent of a lower alcohol soluble high boiling moisturizing liquid selected from the group consisting of dihydric alcohols, trihydric alcohols, higher polyhydric alcohols, esters of adipic acid and esters of phthalic acid.

9. The process according to claim 8, wherein said composition comprises about 90% by weight of said alkali metal dialkyl sulfosuccinate and about 10% by weight of said moisturizing liquid.

10. The process according to claim 8, wherein said moisturizing liquid is glycerol.

11. The process according to claim 8, wherein said alkali metal is sodium.

12. The process according to claim 8, wherein R is $C_6$–$C_{13}$ alkyl.

13. The process according to claim 8, wherein said film comprises plasticized polyvinyl chloride, polyvinylidene chloride copolymers, polybutene, low density polyethylene or copolymers of said low density polyethylene.

14. The process according to claim 8, wherein the thickness of said coating is $1.2 \times 10^{-2}$ to $3.6 \times 10^{-2}$ mils.

15. The process according to claim 8, wherein said composition is deposited on said film from a solution in a lower alcohol.

16. The process according to claim 15, wherein said solution comprises 80–99% and 1–20% of said coating composition by volume.

17. The process according to claim 16, wherein said alcohol is selected from the group consisting of ethyl alcohol and isopropyl alcohol.

18. The process according to claim 17, wherein said alkali metal dialkyl sulfosuccinate is di-2-ethylhexyl sulfosuccinate, said moisturizing liquid is glycerol and said alcohol is isopropyl alcohol.

19. The process according to claim 18, wherein said di-2-ethylhexyl sulfosuccinate and glycerol in a weight ratio of 90:10 are dissolved in isopropyl alcohol in a 2% concentration by volume.

* * * * *